Nov. 4, 1930.                M. TIBBETTS                1,780,281
                            MOTOR VEHICLE
                          Filed Oct. 25, 1928
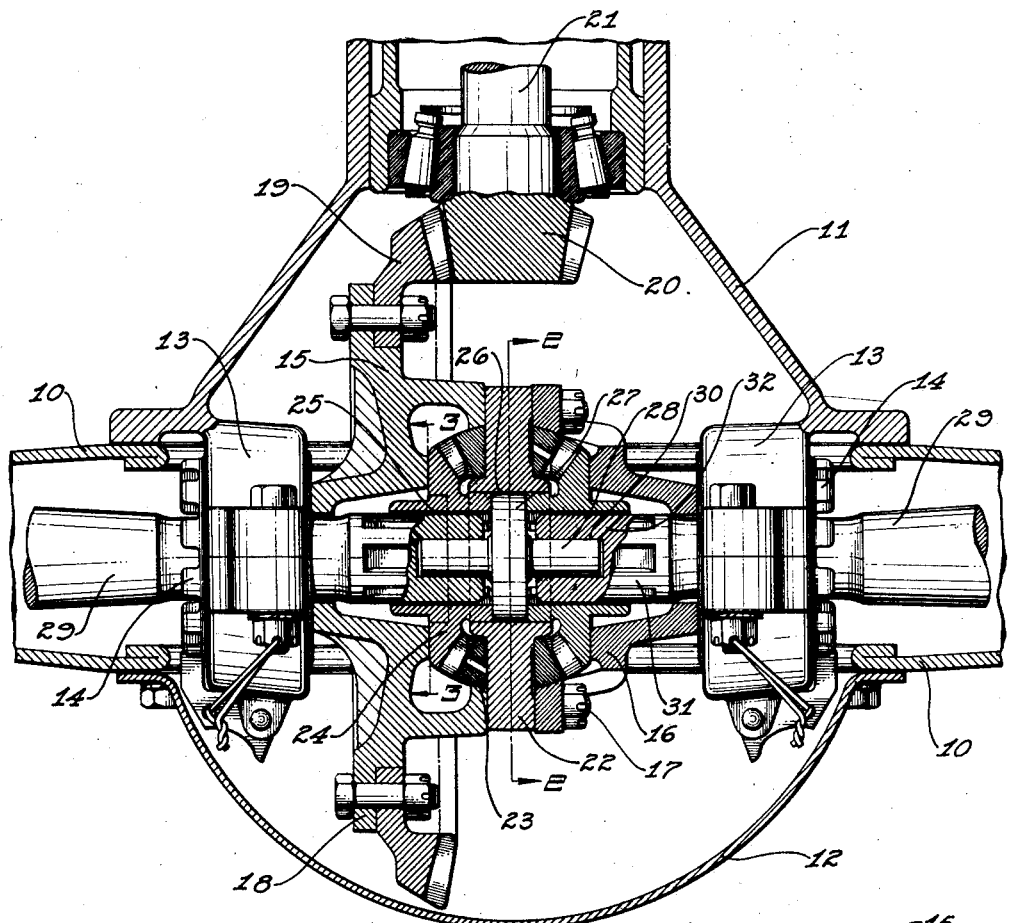
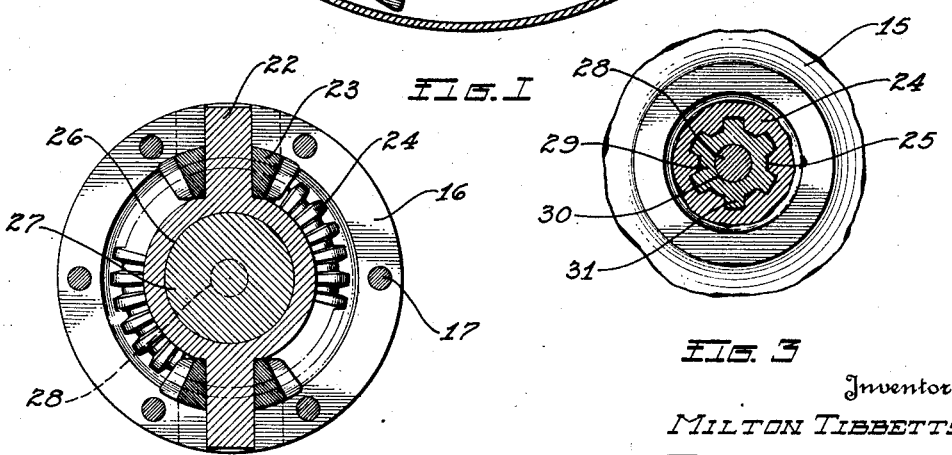
Fig. 1  Fig. 2  Fig. 3
Inventor
MILTON TIBBETTS.

Patented Nov. 4, 1930

1,780,281

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 25, 1928. Serial No. 314,902.

This invention relates to motor vehicles and more particularly to differential structures thereof.

Heretofore, differential assemblies have been supported in a case mounted on bearings supported in a carrier bolted to the axle housing, and the axle shafts have been mounted on ball bearings at the outer end of the axle housing and fitted to the differential gears at the inner ends by means of splines. Grinding the splines on the differential gears and on the ends of the shafts has proved a very difficult and costly process. The grinding of the sides of the splines may be accomplished with ease and at a relatively low cost, but it is a more difficult matter to grind the cylindrical faces between the splines and on the tops thereof. The present invention aims to provide means whereby the axle shafts may be so fitted to the differential gears by splines that the necessity of grinding the curved or cylindrical surfaces on the tops and between the splines is avoided.

An object of the invention is to provide means for eliminating the grinding of the curved surfaces on splined members.

Another object of the invention is to provide means for so centering axle shafts and the differential gears to which the shafts are splined that the necessity of grinding the curved surfaces on the tops and between the splines is avoided.

Another object of the invention is to provide a unitary means for centering axle shafts and the differential gears to which the shafts are splined.

A further object of the invention is to provide a differential assembly in which the differential gears and the axle shafts fitted thereto by means of splines are centered on the pinion spider.

A further object of the invention is to provide a differential assembly having a pinion spider provided with means for centering the differential gears and means for centering the axle shafts fitted to the gears by splines.

A still further object of the invention is to provide a device of the character designated in which the amount of required machine operation on the parts during manufacture shall be materially reduced.

Other objects of the invention will appear from the following description taken in connection with the accompanying drawings, which form a part of this specification, and in which:

Fig. 1 is a longitudinal sectional view of a rear axle embodying the invention;

Fig. 2 is a sectional view taken substantially on line 2—2, Fig. 1, and

Fig. 3 is a sectional view taken substantially on line 3—3 of Fig. 1.

Referring to the drawings for more specific details of the invention, 10 represents a rear axle housing of the conventional type having bolted on one side thereof a differential carrier 11 and on the other side a cover 12. The carrier has spaced sleeves 13 in which are positioned suitable bearings, the adjustment nuts of which are shown at 14.

A differential case is mounted on the bearing in the sleeves 13. As shown, the differential case is formed in two parts 15 and 16 bolted together as at 17 and one of the parts 15 is provided with a flange 18 to which is secured as by bolts a differential drive gear 19 in mesh with a driving pinion 20 formed on one end of a shaft 21 suitably mounted in the carrier 11.

Supported within the differential case between the parts 15 and 16 is a pinion spider 22 having positioned thereon pinions 23, and positioned in the case on each side of the spider are gears 24 in mesh with the pinions 23. The gears 24 have axial bores which are splined as indicated at 25. Generally, these splines are ground on their tops and sides and the surfaces between the splines are also ground. Because of the great difficulty and expense incident to grinding the curved surfaces on the tops of the splines and between the splines, it is proposed to provide means whereby these objections may be eliminated.

The spider 22 is centrally bored as indicated at 26 and this bore is suitably ground to receive a cylindrical member 27, the periphery of which is ground to fit snugly in the bore. The member 27 is positioned centrally in the spider intermediate the hubs of the gears 24 which are ground to fit in the bore 26, and etxending from both ends of the cylindrical member in axial alinement with the member and with respect to each other are trunnions 28, the peripheries of which are also ground, the object of which will hereinafter appear.

Axle shafts 29 are mounted on ball bearings, not shown, at the outer end of the housing 10 and are fitted to the differential gears at their inner ends. As shown, the shafts 29 are provided with axial bores 30 ground to fit the trunnions 28 and with splines 31 which mesh with the splines 25 in the bores of the gears 24, and to provide adequate lubrication between the trunnions 28 and the bores engaged thereby suitable oil ducts 32 are drilled through the shafts to the bores.

The trunnions 28 center the inner ends of the shafts in the spider 22 and the differential gears are centered in the bore 26 in the spider. Thus, the shafts and the differential gears are centered concentrically in the spider, so that only the sides of the splines on the shafts and also in the bores of the differential gears need to be ground, hence, eliminating the necessity of grinding the curved surfaces between the splines and on the tops thereof and thereby materially reducing the cost of production.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of my invention, what I claim and desire to secure by Letters Patent is:

1. A differential assembly comprising a spider, a gear centered on the spider, an axle fitted to the gear by splines and means for centering the axle on the spider in spaced relation to the gear.

2. A differential assembly comprising a spider, a differential gear, means for centering the gear on the spider, an axle fitted to the gear by splines, and means for centering the axle on the spider in spaced relation to the gear.

3. A differential assembly comprising a spider, a differential gear centered axially on the spider, an axle shaft fitted to the gear by splines and means for centering the shaft on the spider with clearance between the tops of the splines and the surfaces between the splines.

4. A differential assembly comprising a spider, a member centered on the spider, differential gears centered on the spider, axle shafts fitted to the gears by splines and means for supporting the shafts on the member concentrically to the gears.

5. A differential assembly comprising a spider, a member positioned axially with relation thereto, differential gears mounted concentric to the member, axle shafts fitted to the gears by splines and means supporting the shafts on the member concentrically to the gears.

6. A differential assembly comprising a spider, a member positioned axially on the spider, a differential gear centered on the spider on each side of the member, axle shafts fitted to the gears by splines and means on the member for supporting the shafts concentrically to the gear with clearance between the tops of the splines and the surfaces between the splines.

7. A differential assembly comprising a casing, a spider supported in the casing, a member positioned axially with relation to the spider, differential gears centered with relation to the spider retaining the member in position, axle shafts fitted to the gears by splines and means on the member for supporting the shafts concentrically to the gears with a clearance between the tops of the splines and the surfaces between the splines.

8. A differential assembly comprising a casing, a pinion spider supported therein, a member positioned axially in the spider, differential gears centered on the spider one on each side of the member, the gears bearing against the casing and the member, axle shafts fitted to the gears by splines and means axially positioned on each side of the member for centering the shafts in the gears.

9. A differential assembly comprising a casing, a pinion spider supported therein, the spider having an axial bore, a member fitted in the bore, a differential gear fitted in the bore on each side of the member, the gears bearing against the member and the casing, axle shafts fitted to the gears by splines and means on each side of the member for centering the shafts in the gears.

10. A differential assembly comprising a casing, a spider supported on the casing having an axial bore, a member fitted in the bore, trunnions axially positioned on the member, differential gears centered on the spider, axle shafts fitted to the gears by splines, the shafts having axial bores receiving the trunnions whereby the shafts are supported in the gears.

11. A differential assembly comprising a spider having an axial bore, differential gears, having hubs fitted in the bore, shafts fitted to the gears by splines and a member in the bore for supporting the shafts concentric to the gears.

12. A differential assembly comprising a spider having an axial bore, differential gears centered in the bore, a member in the bore intermediate the gears, axle shafts fitted to the gears by splines and means on the member for supporting the shafts concentrically and in the gears.

13. In a motor vehicle driving axle, the combination of an axle housing, differential mechanism including differential gears and a differential casing mounted in the housing, axle shafts fitted to the differential gears by splines, means for centering the gears in said casing, and means for supporting the shafts concentric to the gears.

14. In a motor vehicle driving axle, the combination of an axle housing, differential mechanism including a casing mounted on the bearings in the housing, a pinion spider supported in the casing, a member centered axially on the spider, differential gears arranged one on each side of the member and centered on the spider, axle shafts fitted to the gears by splines, trunnions positioned axially on the member, the shafts having bores in the inner ends thereof engaging the trunnions whereby the shafts are centered on the spider concentric to the gears.

15. In a motor vehicle driving axle, the combination of a tubular housing, a differential mechanism including differential gears and a case mounted on bearings therein, shafts connected to said gears by splines, and means for centering the shafts in said case with a clearance between the tops of the splines and the surfaces between the splines.

16. In a motor vehicle driving axle, the combination of a tubular housing, differential mechanism including differential gears and a case mounted on bearings therein, shafts connected to said gears by splines and means for supporting the shafts concentrically of the case and with respect to their connections with the differential gears, whereby a clearance between the tops of the splines and the surfaces between the splines is provided.

In testimony whereof I affix my signature.

MILTON TIBBETTS.